United States Patent [19]

Watson et al.

[11] Patent Number: 4,533,483
[45] Date of Patent: Aug. 6, 1985

[54] HEAT SOURCE PROVIDING A SUBSTANTIALLY CONSTANT TEMPERATURE

[75] Inventors: Susan S. Watson; William K. R. Watson, both of San Diego, Calif.

[73] Assignee: American Hospital Supply Corporation, Evanston, Ill.

[21] Appl. No.: 375,332

[22] Filed: Jul. 2, 1973

[51] Int. Cl.³ .............................................. C09K 3/18
[52] U.S. Cl. ...................................... 252/70; 126/263
[58] Field of Search ............................ 252/70; 126/263; 23/302 R, 302 T, 296, 300, 408.1; 106/13; 423/514, 268, 271

[56] References Cited

U.S. PATENT DOCUMENTS

| | | | |
|---|---|---|---|
| 780,352 | 1/1905 | Kafka | 252/70 |
| 811,750 | 2/1906 | Spieske | 252/70 |
| 1,887,618 | 11/1932 | Bell | 252/70 |
| 1,894,775 | 1/1933 | Levenson | 252/70 |
| 2,114,396 | 4/1938 | McFarlin et al. | 252/70 |
| 2,677,664 | 5/1954 | Telkes | 252/70 |
| 3,952,519 | 4/1976 | Watson | 252/70 |

FOREIGN PATENT DOCUMENTS

2024269 -12/1971 Fed. Rep. of Germany .

Primary Examiner—Josephine L. Barr
Attorney, Agent, or Firm—Ellsworth R. Roston; Charles H. Schwartz

[57] ABSTRACT

A heat source includes a cartridge which contains a first chemical having properties for maintaining a liquid state below its particular melting point. A second chemical, which can be introduced through a valve into the cartridge, triggers the crystallization of the first chemical; this crystallization occurs at the substantially constant temperatures of the particular melting point. The first chemical can be recycled by heating the cartridge above its melting point and subsequently cooling the first chemical below its melting point while maintaining its liquid state. A particularly desirable melting point for the first chemical is provided by a eutectic compound which may include sodium thiosulfate pentahydrate and sodium acetate trihydrate. The heat source is particularly adapted to be disposed in a transportable apparatus for heating a baby even during transport.

20 Claims, 5 Drawing Figures

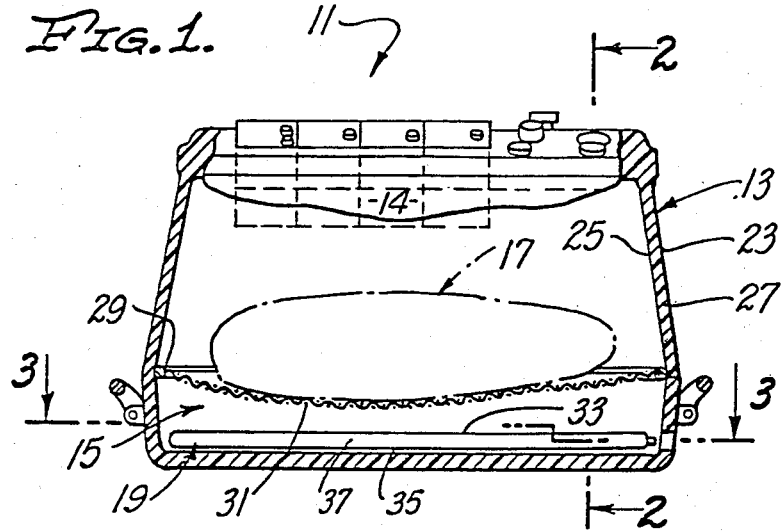
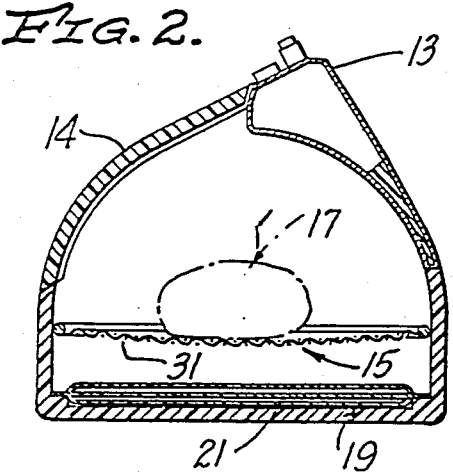
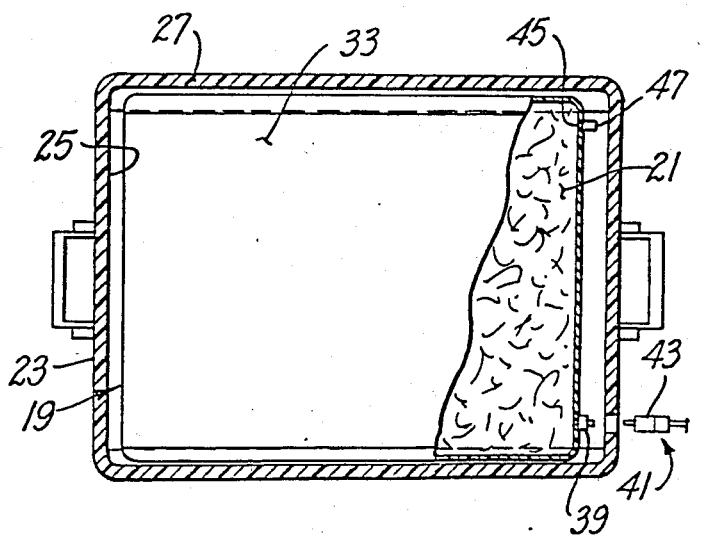
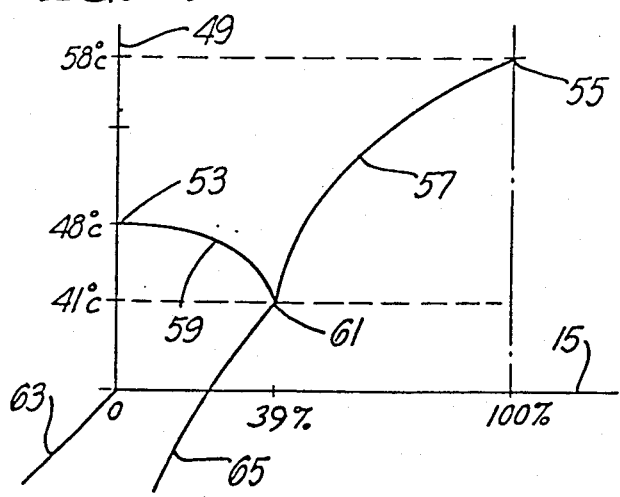
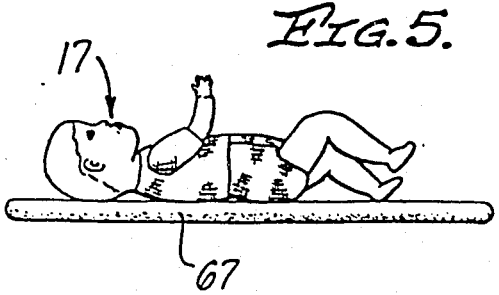

HEAT SOURCE PROVIDING A SUBSTANTIALLY CONSTANT TEMPERATURE

BACKGROUND OF THE INVENTION

1. Field of the Invention

This invention relates generally to a heat source providing a substantially constant temperature and more specifically to chemical means providing a source of heat at a temperature which can be controlled to any desired value with particular limits. The invention is particularly adapted to be used in portable baby transporting apparatus.

2. Description of the Prior Art

It is often desirable to provide a portable heat source which can be actuated in a timely manner to provide a substantially constant temperature for an extended period of time. It is even more desirable if such a heat source can be recycled to repeatedly provide a source of heat. Attempts to provide such a heat source are characterized by hot packs, such as those disclosed in copending application Ser. No. 809,870, filed on Mar. 24, 1969, now abandoned, and assigned of record to the assignee of record of the present application. These hot packs include an outer bag for enclosing a first chemical and an inner bag having a rupturable seal and enclosing a second chemical. Upon striking the outer bag, the rupturable seal of the inner bag permits the mixing of the first and second chemicals. These chemicals have had characteristics for reacting to produce a third chemical in an exothermic reaction. Thus, by striking the hot pack, it has immediately provided a source of heat. However, the temperature of the heat has not been particularly constant, nor has the heat been sustained for an extended period of time. Furthermore, these hot packs of the prior art have not been recyclable to repeatedly provide a source of constant temperature heat.

It has been known that many chemicals give off a latent heat of fusion at the substantially constant temperature of their melting point when the chemicals are cooled from a fluid to a solid state. Such a chemical can be heated to a temperature above its melting point to achieve a fluid state. Then when the chemical is placed in an environment having a temperature below its melting point, it would give off its latent heat of fusion at the substantially constant temperature of its melting point. Unfortunately, a heat source incorporating a chemical of this type would not be immediately available for use as the chemical would first have to be heated to achieve a fluid state. If the chemical was additionally heated after it had achieved its fluid state, its temperature would rise so that at least initially the temperature of the chemical would not be constant. Furthermore, since an external source of heat would be needed to initially heat the chemical, it could only be used in proximity to that heat source.

Baby transporting apparatus of the prior art have included an enclosure for the baby in a plurality of electrically energized coils disposed interiorly of the enclosure to provide a source of heat. It is well known that the use of electricity for heating demands a significant magnitude and quantity of electrical energy. This has been particularly objectionable in the baby transporting apparatus of the prior art wherein batteries of significant size and weight have been used to energize the coils. These batteries, which have increased the weight of the prior art apparatus to a magnitude such as 225 Ipounds, have significantly reduced the portability of these apparatus.

The batteries have also been undesirable due to the explosive nature of the gases used as operating aids and anesthetics. As a result of these explosive gases, the baby transporting apparatus of the prior art have been excluded from many areas, such as delivery rooms, wherein their use could be particularly beneficial.

Heat sources such as energized coils have not provided a particularly constant temperature. When the coils have been energized they have been very hot and when they have been de-energized, they have been cold. Therefore, a thermostat has typically been disposed in the environment to be heated for controlling the energizing of the coils in accordance with the temperature of the environment. Thus, the temperature has fluctuated significantly about a desired temperature. Since the coils have achieved extreme temperatures when energized, they have not been placed in contact with the human body, nor have they been coated with a material having a high emissivity to increase the transfer of heat by radiation. Radiant heat is sometimes desirable since it tends to directly heat interior regions of an object, not merely the surface of the object.

SUMMARY OF THE INVENTION

In the present invention a portable heat source is provided which can be actuated to provide a substantially constant temperature for an extended period of time. The heat source can be stored for a significant period of time and then actuated when it is needed. No auxiliary heat source is needed to melt a chemical immediately prior to use. Furthermore, this heat source can be recycled after each use and stored until the substantially constant temperature is again desired. Since the heat source need not achieve extreme temperatures when energized, it can be placed in contact with the human body and even coated with a material having a high emissivity to enhance the transfer of heat by radiation.

Specifically, the present invention includes a first chemical having characteristics for being supercooled to maintain a liquid state below its melting point. This first chemical can be triggered to initiate its crystallization. This triggering will typically be accomplished by the addition of a second, triggering chemical. Upon being triggered, the first chemical immediately gives off heat at the substantially constant temperature of its melting point, and continues to do so until it has fully crystallized. Since crystallization occurs at the substantially constant temperature of the melting point of the first chemical, this melting point determines the constant temperature of the heat source. Thus, the first chemical can be heated and then supercooled at a room temperature below the temperature of its melting point. When the first chemical is triggered by the second chemical, it crystallizes at the higher temperature of its melting point to provide a source of heat.

A particularly advantageous supercooled chemical is that provided by a eutectic compound including sodium thiosulfate pentahydrate and sodium acetate trihydrate. These chemicals can be combined in variable proportions to provide a particularly desirable melting point at any temperature within a range between 40.8° C. and 48° C. An impurity, such as water, can be added to this eutectic compound to further depress its melting point.

Since the present heat source maintains a substantially constant temperature that need not be extremely hot, it is particularly advantageous for use as a hot pack or a baby mattress which would be maintained in contiguous relationship with the skin of a human being.

This heat source is particularly advantageous when used in conjunction with a baby transporter. The first chemical can be enclosed in an airtight cartridge and the cartridge can be carried interiorly of the transporter with a baby. The walls of the cartridge can be formed from a metal having a high heat conductivity so that there is substantially no warm-up time associated with the transporter. This is particularly important since the use of the transporter need not be anticipated; this makes the transporter particularly advantageous for use in emergencies.

The cartridge can be coated with a paint having a high heat emissivity to increase that portion of the heat transferred by radiation to the baby. Radiant heat is particularly desirable since it heats the inner regions of the baby not merely the skin of the baby.

The crystallization of the supercooled chemical will continue at a rate dependent upon the temperature of the air in the transporter. If the door of the transporter remains closed, the crystallization can take place over a relatively long period of time and at a relatively slow rate. However, if the door of the transporter is open, the temperature of the air in the enclosure will be reduced and the crystallization of the supercooled chemical will take place at a faster rate. This is particularly desirable since it automatically increases the quantity of heat provided at a time when additional heat is particularly desired.

These and other features and advantages of the present invention will become more apparent with a detailed discussion of the preferred embodiments taken in conjunction with the associated drawings.

DESCRIPTION OF THE DRAWINGS

FIG. 1 is a frontal perspective view partially in section showing a baby transporting apparatus including one embodiment of the heat source of the present invention;

FIG. 2 is a cross-sectional view of the apparatus taken on line 2—2 of FIG. 1;

FIG. 3 is a cross-sectional view of the apparatus taken on line 3—3 of FIG. 1; and FIG. 4 is a three-dimensional graph showing a eutectic curve for a compound which is particularly desirable for use in the heat source of the present invention.

DESCRIPTION OF PREFERRED EMBODIMENTS

A portable baby transporting apparatus is shown generally in FIG. 1 and designated by the reference numeral 11. The apparatus 11 includes an enclosure 13 having a door 14 and a platform or bed 15 supporting a baby 17 interiorly of the enclosure 13. A cartridge 19, which may have a generally planar configuration, can be advantageously disposed on the side of the bed 15 opposite that of the baby 17. A first chemical 21 can be disposed within the cartridge 19 to provide a source of chemical energy for heating the interior regions of the enclosure 13 generally and for heating the baby 17 specifically.

The enclosure 13 will typically be an insulated structure including an exterior wall 23, an interior wall 25, and an insulating material 27, such as plastic foam, disposed between the walls 23 and 25. The bed 15, which is preferably removable from the enclosure 13, will typically include a tubular frame 29 and an autoclavable fabric 31 fixed to the frame 29. It is desirable that the fabric 31 be highly porous to facilitate the transfer of heat by radiation from the cartridge 19 to the baby 17. The transporting apparatus 11 can be of the type described in greater detail in copending application Ser. No. 376,792 (now U.S. Pat. No. 3,919,999 issued Nov. 18, 1975) assigned of record to the assignee of record of the present application.

The cartridge 19 is preferably formed from materials having some structural integrity to facilitate the removal of the cartridge 19 from the enclosure 13. In addition, it is desirable that the materials forming the cartridge 19 have a high heat conductivity so that heat provided by the chemical 21 can be readily conducted through the cartridge 19. In a preferred embodiment of the cartridge 19, a first sheet 33 facing the baby 17 is sealed to a second sheet 35 at the edges thereof to define a cavity 37 between the sheets 33 and 35. The chemical 21 is disposed in the cavity 37.

The edges of the sheets 33 and 35 can be joined by any suitable method providing an airtight seal. In a preferred embodiment, the cartridge 19 is formed from aluminum sheets 33 and 35 and the edges thereof are sealed by soldering or welding. Aluminum is particularly advantageous for use in the cartridge 19 due to its availability and high heat conductivity; but it will be apparent to those skilled in the art that many other metals, such as stainless steel, will meet these design goals.

The cartridge 19 can be provided with a valve 39, such as an airtight check valve, for initially filling the cavity 37 with the chemical 21. The filling of the cartridge 19 can be facilitated by providing an opening 45 between the cavity 37 and the atmosphere; the opening 45 provides for the escape of air as the chemical 21 is introduced through the valve 39. After the cavity 37 has been substantially filled with the chemical 21, the opening 45 can be blocked by a plug 47. In a preferred embodiment, 8 to 10 pounds of the chemical 21 are disposed in the cartridge 19.

The valve 39 may be configured to register with an injection apparatus such as a syringe 41 to provide for the introduction of a second chemical 43 into the cavity 37. It is the introduction of this second chemical 43 which causes the first chemical 21 to crystallize and provide heat at the substantially constant temperature of its melting point. This stimulus is sometimes referred to as a trigger.

It is of particular importance that the heating of the enclosure 13 is accomplished by means of chemical energy. There are no heating coils in the apparatus 11 so that an external source of power, such as heavy batteries, is neither needed nor desired. This can be particularly appreciated with reference to the apparatus 11, including the heat source of the present invention, which may weigh as little as 35 pounds while the apparatus of the prior art have weighed as much as 225 pounds.

The heat transfer characteristics of the cartridge 19 are also of particular advantage to the baby transporting apparatus 11. Whereas 90% of the heat provided by the apparatus of the prior art has been transferred by convection, the cartridge 19 transfers approximately 90% of its heat by means of radiation. The radiant heat is highly desirable since it penetrates the skin of the baby 17 to heat directly the vital regions interior of the baby 17. As opposed to the convected heat processes of the prior art, there are substantially no delays associated with the convective heating of the air and the skin of the baby 17, and the subsequent conductive heating of the interior regions of the baby 17.

This difference in heat transfer characteristics can be particularly appreciated when the door 14 of the enclosure 13 is opened. Although the opening of the door 14 may reduce the temperature of the air within the enclosure 13 by as much as 10° C., the vital interior regions of the baby 17 will remain warm and will continue to receive radiant heat from the cartridge 19. Thus, the baby 17 can be readily attended without the fear of providing a severe temperature shock to the baby 17.

To enhance the radiation of the heat in the direction of the baby 17, the outer surface of the sheet 33 can be provided with a dark, rough outer surface preferably having an emissivity greater than 0.85. In a preferred embodiment the outer surface of the sheet 33 is provided with a coating of black paint. The material forming such a coating is preferably heat resistant so that it is not deleteriously affected by the temperatures of the cartridge 19. To inhibit the radiation of heat from the cartridge 19 in directions away from the baby 17, the second sheet 35 can be provided with a light-colored, smooth outer surface preferably having an emissivity less than 0.60. For example, the second sheet 35 may have a silver color which is characteristic of many metals, such as aluminum.

The first chemical 21 can be any chemical, compound, mixture or combination thereof preferably having a melting point in the range between 35° C. and 44° C. It is also desirable that the first chemical 21 have properties for responding to the introduction of the second chemical 43 by changing state at its melting point to provide a source of substantially constant temperature.

In a preferred embodiment the first chemical 21 also has characteristics for being supercooled, which means generally that it can maintain a liquid state at temperatures below its melting point until it is triggered by the second chemical 43. In such an embodiment, the second chemical 43 performs the function of a trigger to initiate the crystallization of the first chemical 21. It is of particular importance that this crystallization takes place at the temperature of the melting point so that as the crystallization progresses the cartridge 19 provides the substantially constant temperature.

Supercooled chemicals are also advantageous for the first chemical 21 because they can be recycled by merely heating the cartridge 19 to a temperature above the melting point. After the chemical 21 has achieved a fluid state, the cartridge 19 can be cooled below the melting point, for example to a normal room temperature, such as 22° C. The supercooled chemical 21 will maintain this liquid state until the use of the apparatus 11 is again desired and the cartridge 19 receives a further injection of the second chemical 43.

In a preferred embodiment, the first chemical 21 is a eutectic compound including sodium thiosulfate pentahydrate, hereinafter referred to as hypo, and sodium acetate trihydrate. Although it is known that hypo has a melting point of 48° C. and sodium acetate trihydrate has a melting point of 58° C., these chemicals can be combined in a ratio by volume of 61 to 39, respectively to provide the eutectic compound with a particularly desirable melting point of 40.8° C. Furthermore, since both the hypo and the sodium acetate trihydrate have characteristics for being supercooled, the eutectic compound also has this highly desired characteristic.

The melting point of the chemical 21, such as the eutectic compound, can be more easily understood with reference to the eutectic curve shown on the graph of FIG. 4. On this graph, the melting point is plotted on the Y axis 49 against the percentage of sodium acetate trihydrate in the eutectic compound which is plotted on the X axis 51. When the compound contains zero percent of the sodium acetate trihydrate, the melting point is that of the hypo as illustrated by the point 53. When the compounds contains 100% of the sodium acetate trihydrate, the melting point of the compound is that of the sodium acetate trihydrate as illustrated by the point 55. With percentages of these compounds between the extremes illustrated by the points 53 and 55, the compound will have a melting point somewhere on the lines 57 and 59. It will accordingly be appreciated that the temperature of the eutectic compound can be controlled at any desired value between 40.8° C. and 48° C. by selecting the proper ratio of the chemicals such as the hypo and the sodium acetate trihydrate.

At a point 61 where the lines 57 and 59 meet, the eutectic compound includes approximately 60% of the hypo and 40% of the sodium acetate trihydrate, and the melting point is approximately 41° C. This preferred ratio of chemicals is also desirable because at the point 61 the eutectic compound is particularly stable in a liquid state below the melting point of 41° C.

If the hypo and sodium acetate trihydrate are mixed in proportions which would theoretically provide a melting point having a temperature greater than the temperature at the point 53, the mixture will not function as a true eutectic compound. Rather, the sodium acetate trihydrate will first crystallize at the temperature of the depressed melting point. This lowers the percentage of sodium acetate trihydrate in the eutectic compound and therefore further depresses the melting point of the compound. When the sodium acetate trihydrate has crystallized to the extent that the melting point of the compound is depressed to approximately 48° C., both the hypo and sodium acetate trihydrate will crystallize. It follows that the characteristics of the eutectic compound including only the hypo and the sodium acetate trihydrate can be appreciated only in those proportions of the hypo and sodium acetate trihydrate which provide a melting point less than that of the hypo, i.e. in the range between 41° C. and 48° C.

If a substantially constant temperature lower than 41° C. is desired, the melting point of the eutectic compound can be depressed further by adding an impurity such as water, glycerin, or urea to the eutectic compound. On a typical eutectic curve, such as that illustrated in FIG. 4, the percentage of impurity included in the compound can be plotted on a Z axis 63 and the melting point of the compound will follow the line 65 which extends downwardly from the point 61 and out of the plane of the page. For example, water can be added to the utectic compound in a percentage from approximately 10% to 0% to provide the first chemical 21 with a melting point in the range substantially between 35° C. and 42° C., respectively.

The hypo and sodium acetate trihydrate are particularly desirable for use as the chemical 21 in the apparatus 11. They provide the eutectic compound with a significantly high latent heat of crystallization of approximately 45 calories per gram so that as the compound crystallizes heat is given off at the substantially constant melting temperature for an extended period of time. These chemicals are also desirable because they are highly stable and have a long storage life. It may also be of importance that these chemicals are nontoxic and non-irritating to the human skin.

The eutectic compound including hypo and sodium acetate trihydrate is also desirable since these chemicals are nonreactive with each other. Furthermore, although both hypo and sodium acetate trihydrate have characteristics for being supercooled, neither chemical is triggered by the other chemical. This feature, which enables the eutectic compound consisting of these chemicals to supercool, is highly desirable in the present invention since the heat source can remain in the supercooled state until it is triggered by the addition of the second chemical 43.

Hypo and sodium acetate trihydrate are also desirable because they can be triggered singularly and in combination by chemicals such as anhydrous sodium thiosulfate pentahydrate and sodium borate decahydrate, either of which can provide the second chemical 43. In a preferred embodiment, the second chemical 43 includes sodium borate pentahydrate. This particular chemical is highly stable, has a long storage life, and is easily shipped. The sodium borate pentahydrate can be formed into crystals which may have a diameter of 10 microns, and the crystals can be suspended, for example, in silicone oil. The crystals can be suspended in any other inert fluid such as peanut oil or corn oil, but the silicone oil is particularly desirable because it will not absorb water and will not depress the freezing point of the first chemical 21, such as the eutectic compound. This may be particularly important if the cartridge 19 is recycled for repeated use. The resulting second chemical 43 can be easily injected by operation of the syringe 41 through the check valve 39 into the cavity 37. A typical injection might include 0.1 to 0.2 milliliters of the sodium borate pentahydrate suspension. Other second chemicals 43 suitable for triggering the first chemical 21 can be of the type disclosed and claimed in copending application Serial No. 554,646, filed Mar. 3, 1975, now abandoned (continuation of Ser. No. 357,817, filed May 7, 1973, now abandoned) assigned of record to the assignee of record of the present application.

Although the physical and chemical transformations are not fully understood, the second chemical 43 mixes with the first chemical 21 so that each of the sodium borate pentahydrate crystals provides a nucleation center about which the eutectic compound forms a crystal. As previously noted, this transformation from a liquid to a solid state takes place at the substantially constant temperature of the melting point of the first chemical 21.

It is of particular interest that, after a first portion of the second chemical 43 has been injected into the cartridge 19 to trigger the first chemical 21, the cartridge 19 can be heated above the melting point of the first chemical and then cooled below the melting point of the first chemical. Upon a subsequent injection of a second portion of the second chemical 43, the cartridge will again provide a source of heat at the constant temperature of substantially the melting point of the first chemical 21. Without being bound by theory since the physical and chemical transformations are not fully understood, when the first chemical 21 and the first portion of the second chemical 43 are heated to recycle the cartridge 19, they may form a third chemical which has a melting point and properties for being supercooled which are substantially the same as those of the first chemical 21. Thus, the cartridge 19 provides substantially the same constant temperature heat characteristics each time it is recycled and a portion of the second chemical is introduced into the cartridge 19. This is true even though previous portions of the second chemical 43 remain in the cartridge 19. The number of times the cartridge 19 can be recycled appears to be limited only by the volume of the cavity 37 and hence the ability of the cartridge 19 to accept an additional portion of the first chemical 21.

The present heat source is particularly desirable for use in the baby transporting apparatus 11 since no batteries need be provided to perform the heating function. Thus, the apparatus 11 is significantly lighter in weight and far less cumbersome than the transporters of the prior art. Additionally, the chemical heating action will enable the apparatus 11 to be present in a delivery room for immediate use upon delivery of a baby. Since the heat is provided at a substantially constant temperature in the desired range, no servomechanism is needed to turn the heat on and off. This will alleviate the possibility of overshooting and undershooting the desired temperature.

If the cartridge 19 is formed from materials having a high heat conductivity, there is substantially no warm-up time so that the use of the apparatus 11 need not be anticipated. This will make the apparatus 11 particularly advantageous for use in emergencies.

The supercooled eutectic compound including hypo and sodium acetate trihydrate is particularly advantageous for use as the chemical 21. This compound can be provided with a melting point of 41° C. which is a preferred temperature within the desirable range of temperatures. The compound is highly stable when it contains the chemicals in the percentages providing this preferred melting point. Lower temperatures in the desirable range of temperatures can be achieved adding impurities, such as water, to this eutectic compound.

The eutectic compound containing the hypo and sodium acetate trihydrate has a relatively high latent heat of crystallization so that 8 to 10 pounds of the compound can sustain the constant temperature of 41° C. for as long as 17 hours.

Although the heat source of the present invention has been described with particular reference to the baby transporting apparatus 11, it is apparent that this invention can be used by itself or in combination with other devices to provide a source of substantially constant temperature heat. For example, the first chemical 21 can be disposed in a flexible bag to provide a hot pack, a blanket, or a mattress 67, such as that shown in FIG. 5. A mattress of this type is disclosed and claimed in copending application Serial No. 509, 261, filed Sept. 25, 1974, now U.S. Pat. No. 3,951,127, (continuation of Ser. No. 374,406, filed June 28, 1973, now abandoned), assigned of record to the assignee of record of the present application. As opposed to the electrically energized coils of the prior art which are thermostatically controlled between extremely hot temperatures and cold temperatures, the present heat source provides a substantially constant temperature facilitating its use in direct contact with the skin of a human being.

As developed and disclosed herein, this new and improved concept provides a significant advance in the art of portable sources of heat. Many other embodiments and alterations of the described embodiments will now become evident to those skilled in the art without avoiding the scope and intent of the invention as defined in the following claims.

We claim:

1. In combination for forming a eutectic composition having a first melting temperature and having properties of remaining in a fluid state at temperatures below the first melting temperature and of being triggered into a crystalline state at the first melting temperature in an exothermic reaction:

a first chemical having a second melting temperature higher than the first melting temperature of the eutectic composition and having properties including a fluid form at temperatures above the second melting temperature, the first chemical being supercoolable to maintain the fluid form even at temperatures below the second melting temperatures and of being triggered into the crystalline state at the second melting temperature in an exothermic reaction;

a second chemical having a third melting temperature higher than the first melting temperature of the eutectic composition and having properties including a fluid form at temperatures above the third melting temperature, the second chemical being supercoolable to maintain the fluid form even at temperatures below the third melting temperature and of being triggered into the crystalline state at the second melting temperature in an exothermic reaction; and the first melting temperature being dependent upon the proportions by weight of the first and second chemicals in the eutectic composition.

2. The combination set forth in claim 1 wherein the first and second supercoolable chemicals have properties of remaining chemically nonreactive with each other in both the fluid state and the crystalline state.

3. The combination set forth in claim 2 further comprising means for triggering the first and second supercoolable chemicals to initiate the crystallization of the eutectic composition at the first melting temperature to provide for the release of heat from the first and second supercoolable chemicals at the first melting temperature.

4. The combination set forth in claim 3 wherein the first and second supercoolable chemicals respectively have properties of returning to the fluid state from the crystalline state upon heating the first and second supercoolable chemicals to a temperature higher than the second and third melting temperatures to provide for a recycling in the operation of the first and second supercoolable chemicals.

5. The combination set forth in claim 4 wherein the first melting temperature can be controlled by varying the relative proportions of the first and second supercoolable chemicals in the eutectic composition.

6. In combination for producing heat at a particular temperature for an extended period of time:

a first chemical having a first melting temperature above the particular temperature and having properties of crystallizing at the first melting temperature in an exothermic reaction and of being converted to the fluid form at a temperature above the first melting temperature and of remaining in the fluid form at a temperature below the first melting temperature;

a second chemical having a second melting temperature above the particular temperature and having properties of crystallizing at the second melting temperature in an exothermic reaction and of being converted to the fluid form at a temperature above the second melting temperature above the second melting temperature and of remaining in the fluid form at a temperature below the second melting temperature;

the first and second chemicals being combined in relative proportions by weight to form a eutectic mixture having the particular melting temperature below the first and second melting temperatures, the eutectic mixture having properties of crystallizing at the particular melting temperature in an exothermic reaction and of being converted to a fluid form at a temperature above the particular melting temperature and of remaining in the fluid form at a temperature below the particular melting temperature; and means for containing the first and second supercooled chemicals in a confined area.

7. The combination set forth in claim 6 further comprising a third chemical included in the eutectic mixture with the first and second chemicals, the third chemical having properties of lowering the melting temperature of the eutectic mixture to the particular temperature from a melting temperature of the eutectic mixture above the particular temperature.

8. The combination set forth in claim 6 wherein the particular melting temperature of the eutectic mixture is dependent upon the relative amounts by weight of the first and second supercooled chemicals in the mixture.

9. The combination set forth in claim 7 wherein the particular temperature is dependent upon the relative amounts by weight of the first and second supercooled chemicals in the mixture and upon the relative amount of the third chemical in the mixture.

10. The combination recited in claim 1 wherein the first supercooled fluid is sodium acetate trihydrate and the second supercooled fluid is sodium thiosulphate pentahydrate.

11. The combination set forth in claim 10 wherein the eutectic material includes by weight the sodium acetate trihydrate in a range between 35% and 45% and the sodium thiosulphate pentahydrate in a range between 55% and 65%.

12. The combination recited in claim 6 wherein the first supercooled fluid is sodium acetate trihydrate and the second supercooled fluid is sodium thiosulphate pentahydrate.

13. The combination recited in claim 12 wherein the eutectic mixture includes by weight sodium acetate trihydrate in a range between 35% and 45% and the sodium thiosulphate pentahydrate in a range between 55% and 65%.

14. The composition of matter recited in claim 7 wherein the third chemical is present in the eutectic mixture in a percentage by weight not greater than 10%.

15. The combination set forth in claim 12 wherein a chemical from a group consisting of water, glycerin, and urea is added to the eutectic material to lower the melting temperature of the eutectic material.

16. The combination recited in claim 13 wherein a chemical from a group consisting of water, glycerin and urea is added to the eutectic material in a range of zero percent (0%) to ten percent (10%) to lower the melting temperature of the eutectic material to a temperature in the range of 35° C. to 42° C.

17. The combination recited in claim 3 wherein the first supercooled fluid is sodium acetate trihydrate and the second supercooled fluid is sodium thiosulphate pentahydrate and the triggering means is selected from a group consisting of anhydrous sodium thiosulfate pentahydrate and sodium borate decahydrate.

18. The combination set forth in claim 17 wherein the eutectic material includes by weight the sodium acetate trihydrate in a range between thirty-five percent (35%) and forty-five percent (45%) and the sodium thiosulfate pentahydrate in a range between fifty-five percent (55%) and sixty-five percent (65%).

19. The combination recited in claim 7 wherein the first supercooled fluid is sodium acetate trihydrate and the second supercooled fluid is sodium thiosulfate pentahydrate and triggering means are provided for triggering the first and second supercooled fluids into a state of conductivity and the triggering means is selected from a group consisting of anhydrous sodium thiosulfate pentahydrate and sodium borate decahydrate.

20. The combination set forth in claim 19 wherein the eutectic mixture includes by weight the sodium acetate trihydrate in a range between thirty-five percent (35%) and forty-five percent (45%) and the sodium thiosulfate pentahydrate in a range between fifty-five percent (55%) and sixty-five percent (65%).

* * * * *